UNITED STATES PATENT OFFICE.

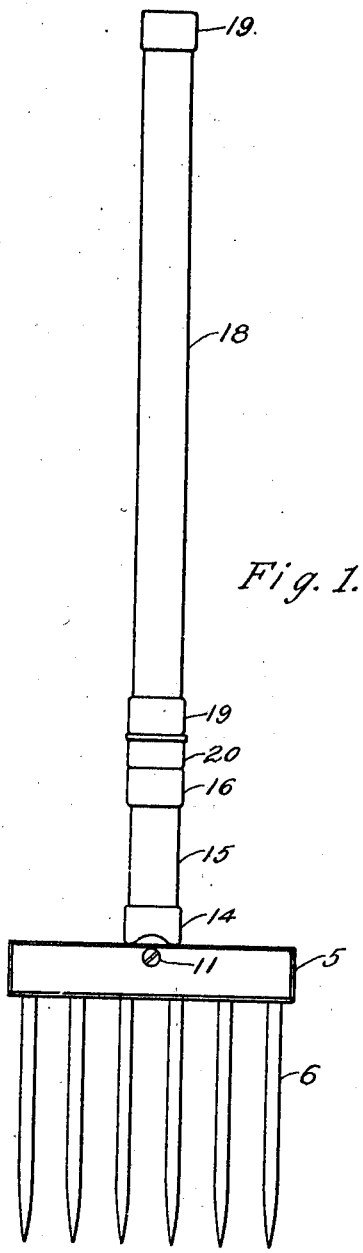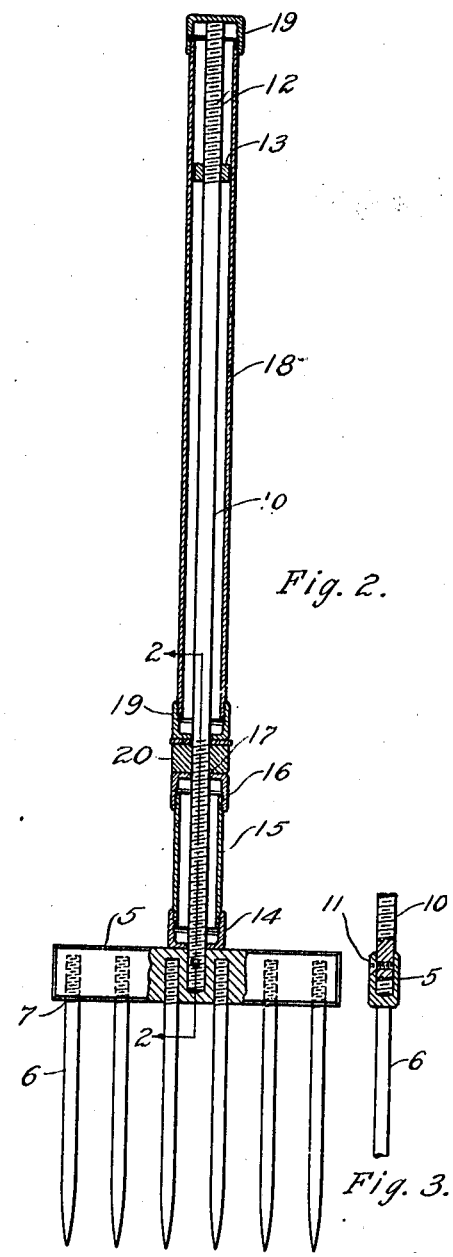

ELMER EKLUND, OF JAMESTOWN, NEW YORK.

ICE-PICK.

1,313,804.   Specification of Letters Patent.   Patented Aug. 19, 1919.

Application filed April 12, 1919. Serial No. 289,622.

*To all whom it may concern:*

Be it known that I, ELMER EKLUND, a citizen of the United States, residing at Jamestown, in the county of Chautauqua and State of New York, have invented a new and useful Ice-Pick, of which the following is a specification.

The present invention relates to ice picks, the object being to provide a device for blocking ice after the same has been sawed in longitudinal strips in the harvesting of the ice.

A second object of the invention is to provide a device of this character which will not waste or chip the ice and which will enable the operator to accomplish a greater amount of work.

A further object of the invention is to provide an ice pick or blocker wherein a plurality of tines are employed which may be readily removed from the device should any one of the same become broken and a new one inserted in its place.

Still another object of the invention is to provide a hand implement for blocking ice which is easily operated and which will strike a blow at two points thereby causing greater force to be transmitted to the ice.

Still another object of the invention is to provide an ice blocking implement which is simple in construction, which consists of few parts which may be assembled and disassembled readily, and which may be constructed and placed on the market at a minimum cost.

With the above and other objects and advantages in mind, the invention consists of combinations of elements, arrangements of parts, constructions and operations, and general assemblage, the details of which will be hereinafter fully enlarged upon and illustrated in the accompanying drawings, the inventive features being explicitly defined in the sub-joined claims.

On the drawing:—

Figure 1 is a front elevation of an ice cutting implement constructed in accordance with my invention;

Fig. 2 is a vertical longitudinal sectional view of the same, the ice cutting members and part of the handle being shown in elevation; and Fig. 3 is a fragmentary sectional view taken on line 2—2 of Fig. 2.

On the drawing, wherein like characters of reference designate like parts on all of the views, the numeral 5 designates a cross head which is in the form of a heavy rectangular bar of metal. A plurality of alined ice piercing tines 6 have their upper ends threaded as indicated at 7 into the bar 5.

Threaded into the upper face of the bar 5 and centrally thereof is a rod 10 which is held against rotation by a set screw 11. The upper end of rod 10 is threaded as indicated at 12 and receives a nut 13 that constitutes a stop. Positioned on the lower end of the rod 10 and upon the upper face of the bar 5 is an internally threaded nipple 14 in which is received the threaded end of a barrel 15, the upper end of which has a nipple 16 threaded thereon, which is provided with an opening 17 for the reception of the rod 10.

Slidably mounted upon the rod 10 is a reciprocatory striker or tubular member 18 which has nipples 19 threaded upon its opposite ends, the lower nipple 19 being engageable with the stop 13 upon the raising of the striker 18 to limit the movement of the same. A head 20 is mounted upon the nipple 16.

In the operation of the device tines 6 are engaged with the ice and the striker 18 reciprocated, the striker contacting with the head 20 and the nipple carried by the upper end of the striker engaging the upper end of the rod 10.

This embodiment of the invention is considered the preferred form but it is to be understood that the same may be modified in many respects and that my limits of modification are only governed by what is claimed.

What is claimed is:—

1. In a device of the character described, a heavy bar, a plurality of tines carried thereby, a rod carried by the bar, a barrel arranged upon the lower end of the rod, a striker head removably mounted on the rod and supported upon the upper end of the barrel, and a tubular member slidably mounted upon the rod adapted to engage the striking head upon the descension of the former member.

2. In a device of the character described, a relatively heavy bar, a plurality of tines extended from the bar, a rod secured to the bar, a nipple positioned upon the rod and bearing against the bar, a barrel threaded into the nipple, a second nipple threaded upon the upper end of the barrel, a striker head mounted upon the rod and positioned upon the last mentioned nipple, a tubular striking member movable on the rod, a nipple threaded upon each end of the striking member, the nipple upon the lower end of the striking member being provided with an opening to receive the rod, the upper end of the rod being engaged by the nipple upon the upper end of the striking member upon the descension of the striking member.

3. In a device of the character described, a bar, cutting elements carried thereby, a rod extending from the bar, a barrel positioned upon the lower end of the rod and bearing against the bar, a striking head having an opening therein receiving the rod, the striking head being positioned upon the upper end of the barrel, and a reciprocatory striker mounted upon the rod engageable with the striking head to drive the cutting element into the object being cut.

In testimony that I claim the foregoing as my own, I have hereto affixed my signature in the presence of two witnesses.

ELMER EKLUND.

Witnesses:
ALBERT SAMPSON,
ERNEST ANDERSON.

Copies of this patent may be obtained for five cents each, by addressing the "Commissioner of Patents Washington, D. C."